United States Patent
Michaelis et al.

(10) Patent No.: US 7,392,329 B2
(45) Date of Patent: Jun. 24, 2008

(54) SYSTEM AND METHOD FOR APPLYING AN ACTION INITIATED FOR A PORTION OF A PLURALITY OF DEVICES TO ALL OF THE PLURALITY OF DEVICES

(75) Inventors: Scott Lynn Michaelis, Plano, TX (US); Marvin J. Spinhirne, Mesquite, TX (US)

(73) Assignee: Hewlett-Packard Devopment, L.P., Houston, TX (US)

( * ) Notice: Subject to any disclaimer, the term of this patent is extended or adjusted under 35 U.S.C. 154(b) by 918 days.

(21) Appl. No.: 10/401,820

(22) Filed: Mar. 28, 2003

(65) Prior Publication Data

US 2004/0193701 A1  Sep. 30, 2004

(51) Int. Cl.
*G06F 13/00* (2006.01)
*G06F 15/177* (2006.01)
*G06F 15/173* (2006.01)

(52) U.S. Cl. .............. 710/8; 710/9; 710/10; 710/15; 710/16; 710/17; 710/18; 710/19; 710/35; 710/317; 709/220; 709/222; 455/418; 712/20; 712/22

(58) Field of Classification Search ........... 710/8–10, 710/15–19, 35, 317; 709/220, 222; 455/418; 712/20, 22
See application file for complete search history.

(56) References Cited

U.S. PATENT DOCUMENTS

| | | | |
|---|---|---|---|
| 5,226,125 A * | 7/1993 | Balmer et al. ............... 710/317 |
| 5,386,512 A | 1/1995 | Crisman et al. |
| 5,522,083 A * | 5/1996 | Gove et al. .................... 712/22 |
| 5,659,786 A | 8/1997 | George et al. |
| 5,784,702 A | 7/1998 | Greenstein et al. |
| 6,233,680 B1 | 5/2001 | Bossen et al. |
| 6,243,823 B1 | 6/2001 | Bossen et al. |
| 6,286,038 B1 * | 9/2001 | Reichmeyer et al. ........ 709/220 |
| 6,516,429 B1 | 2/2003 | Bossen et al. |
| 2002/0045441 A1 * | 4/2002 | Ralston et al. .............. 455/418 |
| 2002/0099752 A1 | 7/2002 | Markos et al. |

OTHER PUBLICATIONS

Bossen, D.C. et al., "Fault-tolerant design of the IBM pSeries 690 system using Power4 processor technology," IBM J. Res. & Dev., vol. 46, No. 1, Jan. 2002, pp. 77-86.
Compaq Computer Corporation et al., "Advanced Configuration and Power Interface Specification," Rev. 2.0b, Oct. 11, 2002, pp. i-xviii, and pp. 1-484.

* cited by examiner

*Primary Examiner*—Tammara Peyton

(57) ABSTRACT

In accordance with one embodiment of the present invention, a method of applying an action initiated for a portion of a plurality of devices to all of the plurality of devices is provided. The method comprises establishing a status block for a plurality of devices that are implemented on a system, and initiating an action for a portion of the plurality of devices. The method further comprises writing information to the status block identifying that the action was initiated, and based at least in part on the information written to the status block, applying the action to all of the plurality of devices.

32 Claims, 2 Drawing Sheets

| BITS | 31-16 | 15-9 | 8-7 | 6-5 | 4-3 | 2-1 | 0 |
|---|---|---|---|---|---|---|---|
| USAGE | SIGNATURE | RESERVED | DEVICE 3 STATUS | DEVICE 2 STATUS | DEVICE 1 STATUS | DEVICE 0 STATUS | MODULE DECONFIGURED |

SYSTEM AND METHOD FOR APPLYING AN ACTION INITIATED FOR A PORTION OF A PLURALITY OF DEVICES TO ALL OF THE PLURALITY OF DEVICES

BACKGROUND

The complexity, capacity, and intelligence of computer systems is ever evolving. Commonly now a plurality of devices are arranged into a multi-device module that may be implemented within a computer system, rather than as discrete devices. For example, processor modules that comprise multiple processors therein are now available. There are generally several advantages to implementing devices within a multi-device module, as opposed to implementing them as discrete devices. For instance, multi-device modules are typically more scalable and more reliable (e.g., many failures occur at interconnects of discrete components, and if they are integrated on a module, better connections may be achieved). Further, multi-device modules may require less power (e.g., multiple devices can typically share a power module more easily). A multi-device module may enable faster communication between the devices implemented therein, and may enable improved sharing of resources (e.g., in the case of a multi-processor module the processors may share an on-device cache). Serviceability may also be improved because with fewer replaceable components, repairing a system may be simplified.

In some instances, it is desirable to have an action applied for all of the devices of a multi-device module if such action is initiated for any of the devices of the module. That is, it may be desired that if a given action is initiated for a first device of a multi-device module, such action also be applied for all other devices of the multi-device module. For example, several situations may arise in which the Operating System (OS) initiates action to deconfigure a processor. For instance, if the OS suspects there is a problem with a processor (e.g., the OS may be receiving errors reported from/for such processor), the OS may decide to deconfigure that processor. Or, in some instances a system administrator might make the decision to deconfigure a processor if he/she suspects there is a problem with such processor. The hardware may require that if one of the processors of a module is deconfigured, all of the processors of the module are to be deconfigured (or this behavior may be desired from a serviceability standpoint to ensure that all components of a module are deconfigured before servicing, e.g., replacing, the module). For instance, if one processor in a module is bad, it may be desirable to have all of the processors of the module deconfigured so that a service technician can readily replace the entire module.

SUMMARY

In accordance with one embodiment of the present invention, a method of applying an action initiated for a portion of a plurality of devices to all of the plurality of devices is provided. The method comprises establishing a status block for a plurality of devices that are implemented on a system, and initiating an action for a portion of the plurality of devices. The method further comprises writing information to the status block identifying that the action was initiated, and based at least in part on the information written to the status block, applying the action to all of the plurality of devices.

In accordance with another embodiment of the present invention, a system comprises a plurality of devices. The system further comprises means for storing status information for the plurality of devices, and means for initiating an action for altering status of a portion of the plurality of devices, wherein the altering writes information to the storing means. The system further comprises means for applying the action for altering status of the portion of the plurality of devices to other ones of the plurality of devices in addition to the portion based at least in part on the information written to the storing means.

In accordance with another embodiment of the present invention, a system comprises a plurality of devices grouped into a multi-device module, and a status block corresponding to the multi-device module. The system further comprises an initiator operable to communicatively access the status block, wherein the initiator is unaware of the plurality of devices being grouped into the multi-device module and wherein the initiator is operable to initiate an action for any one of the plurality of devices, and upon the action being initiated for any one of the plurality of devices information identifying the initiated action is written to the status block.

DETAILED DESCRIPTION

Figures 1, 2:
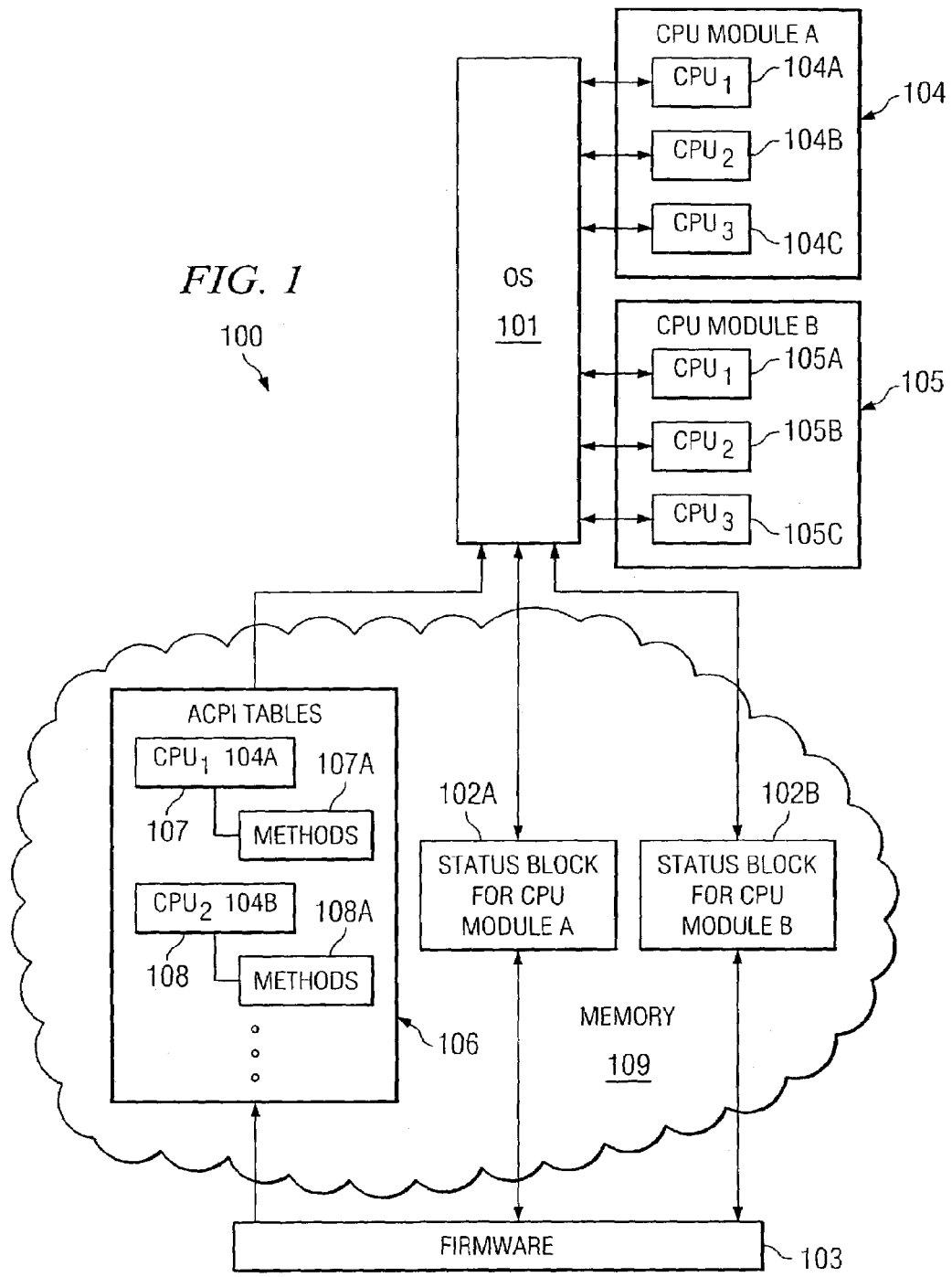
FIG. 1 shows an example of an Advanced Configuration and Power Management Interface (ACPI)-compatible system implementing an embodiment of the present invention.
FIG. 2 shows an example status block that may be implemented in accordance with an embodiment of the present invention.

As described above, devices are beginning to be grouped together into multi-service modules. For instance, multi-processor modules comprising multiple processors and multi-memory modules comprising multiple independent memory chips therein (e.g., single in-line memory modules (SIMMs), dual in-line memory modules (DIMMs)) are available. Various other multi-device modules are expected in the future.

It is often desirable to have an action applied to all of a plurality of devices implemented on a system if the action is initiated for any portion of the plurality of devices. For instance, it is often desirable to have an action applied to all devices of a multi-device module if such action is to be applied to any of the devices of such module. As with the example provided above, it may desired to deconfigure all of the devices of a module if any one of the devices is to be deconfigured. Thus, for instance, if an OS detects a problem with a given processor of a multi-processor module and initiates action to deconfigure such processor, it may be desirable to have that action applied to all of the processors of that module such that they are all deconfigured.

While a plurality of devices may be grouped in a common module, generally the OS of a system is unaware of such grouping of the devices. For instance, a plurality of processors may be grouped into a common processor module that is implemented in a system, and generally the system's OS recognizes that the system comprises the plurality of processors but is unaware that the processors are grouped in a common module. Further, a system may comprise a plurality of modules that each have a plurality of processors (or other devices, such as memory, etc.), and again while the system's OS recognizes that the system comprises the plurality of processors, it is unaware of the grouping of the processors in their respective modules.

Further, it is generally desirable not to require the OS to be aware of the groupings of devices in a module. More specifically, it is generally desirable to keep the mappings of devices to modules transparent to the OS so that a new OS implementation is not required every time a new module mapping is developed and/or implemented in a system. However, it is often desirable to have the OS initiate an action for a device, such as initiating deconfiguration of a processor, rather than having firmware responsible for performing the action. Industry standards, for example, may dictate that certain actions be initiated by the OS. For instance, as is well-known in the art for traditional Intel Architecture (IA)-64 processors, supporting firmware, such as those generally known as System Abstraction Layer (SAL) and Processor Abstraction Layer (PAL) firmware, accompany those processors. Advanced Configuration and Power Management Interface ("ACPI"), which is described further below, is becoming a popular industry standard, and such ACPI standard specifies that certain actions, such as deconfiguring a device for example, be initiated by the OS using an ACPI Machine Language ("AML") method with data supplied in an ACPI table. No SAL call is provided in the ACPI standard to allow the firmware to deconfigure a device. So, for a system to comply with the ACPI standard, the OS performs deconfiguration, rather than making a call to firmware to do it.

As described further below, embodiments of the present invention enable an action initiated for a portion of a plurality of devices to be applied to all of the plurality of devices. As an example, certain embodiments described below enable an action initiated for one device of a multi-device module to be applied to multiple (e.g., all) devices of the module without requiring the initiator to be aware of all of the devices of a module and/or initiate such action for the other devices of the module. That is, certain embodiments enable an initiator (e.g., the OS, system firmware, or a user) to initiate an action for one device of a module and have such action automatically applied to multiple (e.g., all) devices of the module without requiring that the initiator even be aware of the grouping of devices within a common module. Certain embodiments of the present invention are particularly applicable for use with multi-device modules, and therefore many examples of implementation are described herein in conjunction with multi-device modules. However, it should be recognized that such examples are not intended to limit the scope of the present application solely to use with multi-device modules, but are instead intended as examples that render the disclosure provided herein enabling for many other implementations of a plurality of devices. Thus, for instance, embodiments of the present invention may be implemented for discrete devices to enable an action initiated for any portion of a plurality of discrete devices implemented on a system (e.g., discrete processors, discrete disk drives, etc.) to be applied to all of such plurality of discrete devices.

Many situations exist in which it is desirable to have an initiated action applied to all devices of a multi-device module, and thus many example embodiments are described herein below as applying an action to "all" devices of a module. Of course, as described later herein, embodiments of the present invention may just as well be implemented to apply an action initiated for one device of a module to multiple devices of the module without necessarily applying such action to all devices of the module. Accordingly, while many embodiments are described below as applying an action to "all" devices of a multi-device module, such embodiments may be implemented instead to apply an action initiated for one device of the module to multiple devices of the module without necessarily applying it to all of the module's devices. However, the most common usage currently envisioned is for applying an action initiated for one device of a module to all devices of the module.

Certain embodiments of the present invention provide a status structure (or "status block") that is a region of memory dedicated for storing information for a particular multi-device module. More specifically, information (e.g., status information) for all devices of the particular multi-device module is stored to the module's status structure. If an action is initiated for one device of the module, information is written to the status structure indicating that such action was initiated for a device of the module. In response to the information in the status structure, such action may be applied to all devices of the module. That is, the status structure may be accessed (e.g., by system firmware) and responsive to information therein, the action that was initiated for one device of the module may be applied to all devices of the module.

In one embodiment, the status structure is implemented in non-volatile memory (e.g., NVRAM) for each multi-device module of a system, and such status structures may be accessed by both the system firmware and the OS. Thus, upon either the system firmware or the OS initiating an action for a device of a module, information may be written to the status structure identifying the action that was initiated. In certain embodiments, the information includes an identification of the specific device of the module for which the action was initiated. The information in the status structure may then be accessed and the initiated action applied to all of the devices of the module. Preferably, neither the OS nor the system firmware is required to know the mapping of devices to a module, but instead by writing information identifying an action initiated for one device of a module, the action is automatically applied to all devices of the module.

In certain embodiments, method(s) are published on the system for each device of a module, wherein such method(s) may be invoked for initiating an action for its respective device. For instance, an OS may invoke a method published for a given device to initiate the corresponding action (of the method) for the device. The published method(s) for which it is desired to have their actions applied to all devices of a module include the address of a status structure for the module. For instance, it may be desired to have a particular action applied to all devices of a module if such action is initiated for any device of the module. In certain embodiments, for each device of a module a method is published, wherein such method may be invoked to perform the particular action for its corresponding device. Each device's corresponding published method may include an address to a status structure for the module containing such device such that if a method is invoked for any one of the devices of the module, information identifying such initiation of the particular action is written to the module's status structure. In response to information being written to the module's status structure, the particular action is applied to all devices of the module.

One embodiment of the present invention provides a status structure for a multi-device module such that if an action is initiated to alter the status of any of the devices of such multi-device module, the status of all of the devices of the multi-device module is altered. More specifically, for each device of a multi-device module, a method is published on the system (for use by the OS) for initiating an action for altering the status of such device (e.g., deconfiguring the device), and each method comprises writing an identification of the changed status to the module's status structure. Upon a published method being invoked to initiate an action altering the status of a device of a module (e.g., deconfiguring a device of the module), the status structure is updated reflecting the status change and such status change is applied to all of the devices of the module.

Certain embodiments of the present invention are compatible with a standard OS interface for initiating actions for a device, and enabling an initiated action to be applied to all devices of a multi-device module, while maintaining the mapping of devices to their respective modules transparent to the OS. For instance, as mentioned above, ACPI is becoming a popular industry standard, and certain embodiments of the present invention are compatible with such ACPI standard, as described further below.

As is well-known in the art, an OS is one of the most critical components of a computer system. Many OSs are known in the existing art, such as DOS, WINDOWS 2000, WINDOWS NT, UNIX, LINUX, and many others. In general, an OS provides a common platform for all of the software executing on the computer system to utilize. In most computer systems, the OS does not work alone. Typically, it depends not only on the cooperation of other programs, but also on meshing smoothly with the computer system's Basic Input/Output System (BIOS) and software drivers. The BIOS generally acts as an intermediary among the hardware, processor, and OS of a computer system. Device drivers are like a specialized BIOS. Such drivers typically translate commands from the OS and BIOS into instructions for a specific piece of hardware, such as a printer, scanner, or CD-ROM drive, as examples.

During the boot-up process of most computer systems, firmware implementing the system's BIOS is first used to initialize the computer's devices sufficiently for loading the OS from disk to the system's random access memory (RAM). That is, BIOS boot code stored in the system's read only memory (ROM) is first invoked to control initialization of the system's hardware devices and begin loading of the system's OS. During such boot-up process, the BIOS may identify the hardware resources of the computer system and may make sure that the resources, such as the central processing unit(s) (CPU(s)), memory, etc., are functioning properly (e.g., by performing a power on self-test (POST)). Once the OS is loaded, control of the system is passed over to such OS. In a plug-and-play system, a resource arbitrator may be included in the OS to decide what resources (e.g., interrupts, etc.) to allocate to each device coupled to the system.

As the complexity of computer systems have evolved, techniques have been developed for managing the power consumption of such computer systems. For instance, BIOS-based power management techniques for implementing Advanced Power Management (APM) have been used in some computer systems of the existing art. With such traditional APM techniques, the OS has no knowledge of the APM being implemented. Because problems caused by the APM may appear to users to be caused by the OS, many OS developers prefer to have a power management technique implemented that is directed by the OS. Accordingly, more recently an interface specification known as ACPI has been developed for OS-directed power management (OSPM) and configuration.

ACPI is an open industry specification co-developed and released to the public by COMPAQ Computer Corporation, INTEL Corporation, MICROSOFT CORPORATION, PHOENIX Technologies Ltd., and TOSHIBA Corporation. The ACPI specification was developed to establish industry-standard interfaces for OS-directed configuration and power management on computer systems, such as personal computers (PCs), laptops, desktops, and servers. ACPI is a well-known, evolving standard in the existing art, and the current versions of ACPI are described in greater detail in "Advanced Configuration and Power Interface Specification," Revision 2.0 Errata (Jul. 27, 2000), and "Advanced Configuration and Power Interface Specification" Revision 2.0b (Oct. 11, 2002), the disclosures of which are hereby incorporated herein by reference. The ACPI specification defines the ACPI interfaces, including the interface between the OS software, the hardware, and the BIOS software. In addition, the specification also defines the semantics of these interfaces.

In general, ACPI defines an extensible means by which an OS can be given greater control over the power management and resource management in computer systems. For instance, ACPI defines a hardware and software interface by which an OS can manipulate the characteristics of the system's hardware resources (e.g., motherboard devices). This technology differs from traditional BIOS-based technologies in at least two regards: (i) the BIOS support code is written in a p-code called ACPI Machine Language ("AML"), discussed further herein, rather than in the native assembly language of a platform; and (ii) the BIOS support code does not determine the policies or time-outs for power or resource management. Rather, these polices are determined by the OS.

The ACPI hardware interface provides functionality to the OS in at least two categories: (i) control/detection of system control events using a normal interrupt known as System Control Interrupt ("SCI"), and (ii) control of the system power state. The details of a platform's support for the hardware interface are provided in a set of well-defined tables (referred to as "ACPI tables") within the system BIOS.

AML is pseudo-code for a virtual machine supported by an ACPI-compatible OS and in which ACPI control methods (described further below) are written. That is, AML is a pseudo-code assembly language that is interpreted by an OS driver. Chapter 17 of the "Advanced Configuration and Power Interface Specification" Revision 2.0b, published Oct. 11, 2002, describes the ASL reference, the disclosure of which is incorporated herein by reference. ACPI Source Language (ASL) is the programming language equivalent for AML. ASL is the programming language typically used by developers (e.g., OEMs and BIOS developers) to create source code that is compiled into AML images. That is, ASL is the source language typically used for writing ACPI control methods. The ASL code is then translated by a translation tool to AML code versions of the control methods.

A control method is a definition of how the OS can perform a relatively simple hardware task. For example, the OS may invoke such a control method to alter the status of a hardware device (e.g., to deconfigure the device). Control methods are generally written in AML, which can be interpreted and executed by the ACPI-compatible OS. Typically, an ACPI-compatible OS provides a set of well-defined control methods that ACPI table developers can reference in their control methods. Thus, for example, OEMs can support different revisions of chip sets with one BIOS by either including control methods in the BIOS that test configurations and respond as needed or including a different set of control methods for each chip set revision.

The ACPI software interface provides the means for the OS to find the different ACPI-related tables in the system BIOS and means for the OS to understand and control the characteristics of certain hardware devices using AML. The AML resides in the ACPI tables within the system BIOS. Thus, ACPI tables are constructed that describe, for the system's OS, hardware resources that may be available to the computer system. Such descriptions in the ACPI tables may comprise AML code for a hardware resource that defines a control method (e.g., for a hardware-specific function) that may be used by the OS.

An OS that is ACPI-enabled comprises an interpreter for AML. While use of ASL is not mandatory, most developers typically use ASL as their preferred source language. At least in theory, a user can develop their own arbitrary source language, and use a translator to translate this arbitrary source language into AML. AML is the language processed by the ACPI method interpreter. It is primarily a declarative language and provides a set of declarations that is compiled by the ACPI interpreter into the ACPI Namespace at definition block load time. The ACPI Namespace is a hierarchical tree structure in OS-controlled memory that comprises named objects. These objects may be data objects, control method objects, bus/device package objects, and so on. The OS dynamically changes the contents of the Namespace at runtime by loading and/or unloading definition blocks from the ACPI tables that reside in the ACPI BIOS.

It is important to note that a major functional value of the ACPI model is that ACPI provides a means for firmware to describe the hardware of a computer system to an OS with standard data structures. In addition to the descriptive power of ACPI, hardware-dependent operations may also be provided in the tables as ACPI objects (e.g., control methods that are coded in AML).

An example of an ACPI-compatible system 100 implementing an embodiment of the present invention is shown in FIG. 1. As shown, system 100 comprises ACPI-compatible OS 101, system firmware 103, and memory 109. System 100 further comprises CPU module A 104 having $CPU_1$ 104A, $CPU_2$ 104B, and $CPU_3$ 104C included therein, and CPU module B 105 having $CPU_1$ 105A, $CPU_2$ 105B, and $CPU_3$ 105C included therein. This example embodiment of FIG. 1 implements a status block 102A for CPU module A 104 and a status block 102B for CPU module B 105. An example of a status block, such as status block 102A or status block 102B, according to one embodiment of the present invention is described hereafter in conjunction with FIG. 2. It should be understood that memory 109 may comprise any suitable non-volatile data storage device (e.g., NVRAM) for storing status blocks 102A-102B thereto.

The example ACPI-compatible system 100 further comprises ACPI tables 106. As described briefly above, ACPI tables 106 are well-known in the art and commonly comprise a device tree identifying the hardware devices implemented on a system and may also comprise hardware-specific methods (e.g., AML methods) that may be invoked for a corresponding hardware device. For instance, ACPI tables 106 would generally comprise an entry for each CPU 104A-104C and 105A-105C implemented on system 100. FIG. 1 specifically shows an entry 107 for $CPU_1$ 104A and an entry 108 for $CPU_2$ 104B. Entries 107 and 108 comprise methods (or "operating routines") 107A and 108A, respectively, wherein such methods 107A and 108A may be utilized for initiating an action on $CPU_1$ 104A and $CPU_2$ 104B, respectively. Including such methods in ACPI tables 106 publishes those methods to OS 101. For example, as is well known in the art of ACPI-compatible systems, a method for deconfiguring $CPU_1$ 104A may be included in methods 107A and a method for deconfiguring $CPU_2$ 104B may be included in methods 108A, and OS 101 may utilize such published methods to selectively deconfigure either of such CPUs.

Generally, at boot-time of system 100, firmware 103 discovers the hardware devices included in system 100, such as CPUs 104A-104C and 105A-105C, and firmware 103 constructs the system's device tree by populating ACPI table 106 with an entry for each hardware device discovered. That is, ACPI tables 106 are built by firmware 103 to describe the hardware present in system 100 to OS 101. Further, if hardware-specific methods (e.g., AML methods) are needed for a hardware device, firmware 103 writes such method(s) to ACPI tables 106, thereby publishing the methods to OS 101, as described further below. As an example, generally a method is published for each CPU of system 100 for deconfiguring such CPU. Thereafter, if the bootup is successful, OS 101 eventually gains control of system 100 and accesses ACPI tables 106 to determine the hardware devices it has available in system 100 and any corresponding device-specific methods that may be used for the hardware devices.

Further, in accordance with an embodiment of the present invention, firmware 103 may create status blocks 102A and 102B for CPU modules A 104 and B 105, respectively, on the initial bootup of system 100. Any of various techniques now known or later discovered may be used for discovering a multi-device module implemented in a system and creating a status block for such module. As one example, system firmware 103 may include hard-coded "knowledge" as to how many modules may be installed on system 100. At system boot-time, system firmware 103 may check NVRAM to see if the needed status blocks for the modules that may be installed on system 100 exist. If the status blocks do exist, then the boot process continues and the status blocks may be used in the manner described further herein. If, on the other hand, the status blocks do not exist, system firmware 103 may create them in NVRAM. For example, system firmware 103 may create a status block for each module that may possibly be installed on system 100 irrespective of whether each module is actually installed. For instance, system 100 may be capable of receiving three multi-device modules, wherein each multi-device module has two devices. Thus, firmware 103 may have this "knowledge" about system 100 and on the initial bootup of system 100, firmware 103 may create a status block for each of the three multi-device modules.

In other embodiments, firmware 103 may be operable to dynamically identify modules that are installed in system 100 (e.g., during the boot-up process of system 100). For each detected module installed on system 100, firmware 103 may determine whether a corresponding status block exists in NVRAM for such module, and if a corresponding status block does not exist, firmware 103 may create it.

Various techniques now known or later discovered may be used for firmware 103 determining that a plurality of devices are grouped in a common module. As an example, in one embodiment, firmware 103 determines which devices are arranged in a common module using a combination of hard-coded knowledge and Control Status Register (CSR) reads. For instance, it may be possible to couple either a single or a dual-device module in a CPU socket of system 100. System firmware 103 may be hard-coded to know that these are the possible types of modules that may be coupled to this particular system. System firmware 103 then reads a CSR that indicates whether a single-CPU module or multi-CPU module is installed to a CPU socket of the system. If it is a multi-CPU module that is installed, firmware 103 knows that there are two devices contained in that module. Other system CSRs indicate may be used that state the "location" of the module within the system. Firmware reads those CSRs and determines (in combination with its hard-coded knowledge about system 100) which CPUs are contained within a given module. For instance, the CSRs that are read by firmware 103 may give different responses based on the location of the CPU issuing the read. For example, a CPU in one location of the system could read a CSR at address X and discover that it is in location A, a different CPU could read address X and return a different value, discovering that it is in location B. Firmware 103 knows how to decode this data to determine the groupings of CPUs within modules. Of course, other techniques now known or later developed may be implemented for determining the grouping of devices with their respective modules, and such determined grouping may be used, for example, for creating a proper status block for each module coupled to the system.

As shown by the communication arrows in FIG. 1, OS 101 is generally capable of communicating (e.g., assigning tasks) to each of CPUs 104A-104C and 105A-105C of system 100. However, as explained above, OS 101 is generally not aware of the grouping of such CPUs in their respective modules. For instance, OS 101 is aware that CPUs 104A-104C exist in system 100, but it is unaware that they are grouped together in any way (e.g., in module A 104). Rather, the groupings (or "mappings") of CPUs is transparent to OS 101, and thus OS 101 views/treats each CPU as being an independent CPU having no grouping (or mapping) with any other CPU.

In some instances, an action may be initiated (e.g., by OS 101) for one of CPUs 104A-104C of module A 104, for example, and it may be desirable to have such action applied to all of CPUs 104A-104C of module A 104. For example, it may be desired that if any one CPU of a module is deconfigured, all of the CPUs of the module be deconfigured. As described above, OS 101 is unaware of the grouping (or "mapping") of the CPUs, and thus OS 101 is unaware of the desire to deconfigure all of the CPUs of a module if it deconfigures any one of the CPUs of the module.

In accordance with one embodiment of the present invention, firmware 103 establishes status blocks 102A and 102B for CPU modules A 104 and B 105, respectively, to enable an action (e.g., deconfiguration) initiated for one CPU of a module to be applied to all of the CPUs of that module. As described further below, such implementation of status blocks 102A and 102B of an embodiment of the present invention does not require OS 101 to be aware of the grouping (or mapping) of CPUs to their respective modules, but instead enables such grouping of CPUs to remain transparent to OS 101 while enabling certain actions initiated (e.g., by OS 101) for a CPU of a module to be automatically applied to all of the CPUs of that module.

As described above, ACPI tables 106 are built by firmware 103 to describe the hardware present in system 100 to OS 101. Further, if hardware-specific methods (e.g., AML methods) are needed for a hardware device, firmware 103 writes such method(s) to ACPI tables 106, thereby publishing the methods to OS 101. As an example, a method may be published for each CPU of system 100 for deconfiguring such CPU. More specifically, an address may be published for each CPU which informs OS 101 as to the address that OS 101 is to write to when deconfiguring a particular CPU. In an embodiment of the present invention, firmware 103 publishes the same address for each CPU of a common module. That is, an address identifying the same status block is published for each CPU of a common module. For instance, in the example of FIG. 1, the deconfigure method published for each of CPUs 104A-104C of module A 104 causes OS 101 to write to status block 102A, and the deconfigure method published for each of CPUs 105A-105C of module B 105 causes OS 101 to write to status block 102B. Thus, because all CPUs in a common module have the same address (for their status blocks), if OS 101 deconfigures one of such processors of the module, the others are automatically deconfigured as well. For example, if OS 101 initiates a deconfigure action for deconfiguring CPU₁ 104A, the deconfigure method for such CPU₁ 104A causes OS 101 to write information to status block 102A indicating that such deconfigure method was initiated. Because such deconfiguration information is written to status block 102A, the deconfiguration action is applied to all of CPUs 104A-104C of module A 104. That is, by changing the status of one of CPUs 104A-104C, OS 101 automatically changes the status of all of such CPUs 104A-104C by writing the status change to a common status block 102A for module A 104. This allows OS 101 to deconfigure all CPUs in a module without knowing which CPUs are in that module.

Turning to FIG. 2, an example status block that may be implemented in accordance with an embodiment of the present invention is shown. In this example, a 32-bit structure is shown with the information provided in each bit identified. The least significant bit (bit 0) identifies whether the corresponding module is deconfigured, in this example. Of course, the example status block implementation of FIG. 2 is used for a deconfiguration method, and in other implementations such a status block may be used for other types of methods (or actions) to be invoked for devices of a module and such bit 0 may identify the application of such other types of methods for the devices of the module. Further, various status blocks may be implemented for a given module in certain embodiments, with different status blocks containing information relevant to different methods that may be invoked for devices of the module.

Bits [2:1] identify the status of a first device ("device 0") of the module in the example of FIG. 2. For instance, if this status structure were implemented for CPU module A 104 of FIG. 1, bits [2:1] may be used to identify the status of CPU₁ 104A. Bits [4:3] identify the status of a second device ("device 1") of the module. For instance, again if this status structure were implemented for CPU module A 104 of FIG. 1, bits [4:3] may be used to identify the status of CPU₂ 104B. Similarly, bits [6:5] identify the status of a third device ("device 2") of the module, and bits [8:7] identify the status of a fourth device ("device 3") of the module.

Bits [15:9] are reserved in this example, and thus enable the structure to be readily expanded for a module comprising more than four devices. And, bits [31:16] comprise a signature in this example that is used to ensure that the information included in the other bits of the status structure is valid and secure. When the system is initialized, system firmware 103 writes a signature to each valid status structure, and when any subsequent accesses are made to the status structure, its signature is verified to match the original value to ensure that no corruption has occurred. Thus, the signature aids in ensuring the integrity of the remaining bits of such status structure.

Of course, in other embodiments different bits may be used to represent different portions of the information. Also, in other embodiments, the status structure may comprise more or less than 32 bits. Accordingly, while FIG. 2 provides an example implementation of a status structure that may be utilized with embodiments of the present invention, the scope of the present invention is not limited to such specific implementation of a status structure. Rather, any suitable status structure for storing information regarding initiation of an action for a device of a multi-device module to enable such action to be automatically applied to other devices of the multi-device module is intended to be within the scope of the present invention.

In operation of one embodiment, when system 100 is initialized, system firmware 103 writes a signature to each valid status structure (e.g., status blocks 102A and 102B). When any subsequent accesses are made to the status structures, their respective signature is verified to match the original value to ensure that no corruption has occurred. Further, upon initialization of system 100, system firmware 100 writes zero to all of the other fields of the status blocks.

As mentioned above, method(s) may be published on system 100 that when invoked for initiating an action for a device causes information to be written to the status block of a module in which such device is grouped. In certain embodiments, the information written to the status block identifies the specific device for which the action was explicitly initiated, as well as identifying the devices for which the action was sympathetically applied (i.e., was applied solely because of the device's grouping in a common module with the device for which the action was explicitly initiated). Table 1 shows example values that may be written to fields of a status structure (such as the example status structure of FIG. 2) in response to a deconfiguration method being invoked for a device of a multi-device module, along with an explanation of the information that such values represent in accordance with one embodiment of the present invention.

TABLE 1

| Name | Value | Explanation |
|---|---|---|
| HW_DECONFIG | 0 | Sympathetic deconfiguration. This device was deconfigured indirectly solely because of it being grouped in a common module with a device that was explicitly deconfigured. |
| SHELL_DECONFIG | 1 | This device was explicitly deconfigured from a firmware shell. |
| OS_DECONFIG | 2 | This device was explicitly deconfigured by the Operating System. |
| HW_FAILED | 3 | This device was explicitly deconfigured by a user due to a failure. |

As an example of the operation of one embodiment, upon initialization of system 100, system firmware 103 constructs status block 102A for module A 104 (of FIG. 1). As described above, a signature is written to the signature field of the status block, and the remaining fields of the status block are initialized to zero, thus resulting in a status block such as shown in Table 2 below.

TABLE 2

| | | Bits | | | | |
|---|---|---|---|---|---|---|
| | 31-16 | 15-7 | 6-5 $CPU_3$ | 4-3 $CPU_2$ | 2-1 $CPU_1$ | 0 Module A |
| Information | Signature | Reserved | 0 | 0 | 0 | 0 |

Thereafter, suppose that during a later bootup process of system 100, firmware 103 detects a failure of $CPU_1$ (e.g., $CPU_1$ does not pass its POST). Firmware 103 initiates an action to deconfigure such $CPU_1$. As a result of the action for deconfiguring $CPU_1$, information is written to status structure 102A identifying such deconfiguration. For instance, a 1 is written to the least significant bit of status structure 102A (indicating that a deconfiguration action has been taken for a device of module A), and a 1 is written to the status field of $CPU_1$ within status structure 102A (indicating that the deconfiguration was explicitly initiated by the firmware for $CPU_1$). Accordingly, this results in status block 102A having values as shown in Table 3 below.

TABLE 3

| | | Bits | | | | |
|---|---|---|---|---|---|---|
| | 31-16 | 15-7 | 6-5 $CPU_3$ | 4-3 $CPU_2$ | 2-1 $CPU_1$ | 0 Module A |
| Information | Signature | Reserved | 0 | 0 | 1 | 1 |

From analysis of the information in Table 3, it can be determined that all of the devices of module A are to be deconfigured (because of the value 1 in the least significant bit of the status block). That is, in this example, if the value of the least significant bit of status structure 102A is "0", all of the devices of module A are configured, and if the value of the least significant bit of status structure 102A is "1", all of the devices of module A are deconfigured. It can further be determined that $CPU_1$ is the device of module A for which the deconfiguration action was explicitly initiated (because of the value 1 in the field for $CPU_1$), and it can be determined that the remaining devices ($CPU_2$ and $CPU_3$) of module A were deconfigured sympathetically. Further, it can be determined that $CPU_1$ was deconfigured by OS 101 (because of the value "1" in the field for $CPU_1$).

Suppose instead that during operation of system 100, OS 101 detects a problem with $CPU_1$ (e.g., it is receiving errors from $CPU_1$). OS 101 initiates an action to deconfigure such $CPU_1$. That is, OS 101 may invoke a published method for $CPU_1$ for deconfiguring such $CPU_1$. The method for $CPU_1$ specifies that information is to be written to status structure 102A identifying such deconfiguration. For instance, a 1 is written to the least significant bit of status structure 102A (indicating that an action has been taken for a device of module A), and a 2 (i.e., "10 in binary) is written to the status field of $CPU_1$ within status structure 102A (indicating that the deconfiguration was explicitly initiated by the OS for $CPU_1$). Accordingly, this results in status block 102A having values as shown in Table 4 below.

TABLE 4

| | | Bits | | | | |
|---|---|---|---|---|---|---|
| | 31-16 | 15-7 | 6-5 $CPU_3$ | 4-3 $CPU_2$ | 2-1 $CPU_1$ | 0 Module A |
| Information | Signature | Reserved | 0 | 0 | 2 | 1 |

From analysis of the information in Table 4, it can be determined that all of the devices of module A are to be deconfigured (because of the value 1 in the least significant bit). That is, if the value of the least significant bit of status structure 102A is "0", all of the devices of module A are configured, and if the value of the least significant bit of status structure 102A is "1", all of the devices of module A are deconfigured, in this example. It can further be determined that $CPU_1$ is the device of module A for which the deconfiguration action was explicitly initiated (because of the value 2 in the field for $CPU_1$), and it can be determined that the remaining devices ($CPU_2$ and $CPU_3$) of module A were deconfigured sympathetically. Further, it can be determined that $CPU_1$ was deconfigured by OS 101 (because of the value "2" in the field for $CPU_1$).

It should be understood that if an error were detected by OS 101 for $CPU_2$, rather than for $CPU_1$, OS 101 may initiate a deconfiguration method for $CPU_2$, which would result in a 1 being written to the least significant bit of the status block of module A (in the manner described above with Table 4) and would result in a 2 being written to the field for $CPU_2$ rather than for the field of $CPU_1$. Thus, each of the deconfiguration methods published for the CPUs of module A result in writing a 1 to the least significant bit of module A's status block (thus identifying that all processors of the module are to be deconfigured), and each method also results in writing an identification of the initiator to the specific field associated with the CPU for which the action (deconfiguration) was explicitly initiated.

Continuing with the example of Table 4, in one embodiment, upon system 100 being reset, system firmware 103 accesses status structure 102A and determines that its least significant bit is set to 1, and responsive to such information, deconfigures all of the devices ($CPU_1$, $CPU_2$, and $CPU_3$) of module A. That is, in reconstructing the device tree of ACPI table 105, firmware 103 does not include CPUs 104A-104C of module A therein (or otherwise indicates that such CPUs are all deconfigured, e.g., the CPUs may be included in the device tree but marked as deconfigured). In some implementations, OS 101 may be implemented to periodically check status structure 102A to determine the status of the hardware devices, and thus may determine such devices as being deconfigured without a reset of the system. That is, OS 101 may be implemented to use the status in status block 102A to decide not to use the deconfigured CPUs 104A-104C of module A 104 without requiring a system reset. More specifically, OS 101 may periodically check the status of CPUs 104A-104C by accessing status block 102A (e.g., evaluating the least significant bit of such status block), and if it determines that those CPUs are scheduled for deconfiguration (e.g., because of a 1 in the least significant bit of such status block), OS 101 could choose at that point to stop using such CPUs 104A-104C. For instance, a status method may be published for each of the CPUs 104A-104C that OS 101 may utilize to check the status of such CPUs, and each status method for CPUs 104A-104C may direct OS 101 to check status block 102A (e.g., the least significant bit thereof) to determine the status of such CPUs. Further, in certain implementations, a deconfiguration method may trigger initiation of a status method thereafter such that upon OS 101 deconfiguring one of CPUs 104A-104C, it performs a status method check for all of such CPUs and discovers that all of CPUs 104A-104C are scheduled for deconfiguration.

Now suppose that during operation of system 100, a system administrator detects a problem with $CPU_1$ and inputs a command to the system to deconfigure such $CPU_1$. Responsive to such command, OS 101 may initiate an action to deconfigure $CPU_1$. That is, OS 101 may invoke a published method for $CPU_1$ for deconfiguring such $CPU_1$. The method for $CPU_1$ specifies that information is to be written to status structure 102A identifying such deconfiguration. For instance, a 1 is written to the least significant bit of status structure 102A (indicating that an action has been taken for a device of module A), and a 3 (i.e., "11" in binary) is written to the status field of $CPU_1$ within status structure 102A (indicating that the deconfiguration was explicitly initiated by a user for $CPU_1$). Accordingly, this results in status block 102A having values as shown in Table 5 below.

TABLE 5

| | | | Bits | | | |
|---|---|---|---|---|---|---|
| | 31-16 | 15-7 | 6-5 $CPU_3$ | 4-3 $CPU_2$ | 2-1 $CPU_1$ | 0 Module A |
| Information | Signature | Reserved | 0 | 0 | 3 | 1 |

From analysis of the information in Table 5, it can be determined that all of the devices of module A are to be deconfigured (because of the value 1 in the least significant bit). That is, in this example, if the value of the least significant bit of status structure 102A is "0", all of the devices of module A are configured, and if the value of the least significant bit of status structure 102A is "1", all of the devices of module A are deconfigured. It can further be determined that $CPU_1$ is the device of module A for which the deconfiguration action was explicitly initiated (because of the value 3 in the field for $CPU_1$), and it can be determined that the remaining devices ($CPU_2$ and $CPU_3$) of module A were deconfigured sympathetically. Further, it can be determined that $CPU_1$ was deconfigured by a user (because of the value "3" in the field for $CPU_1$).

It should be recognized that in certain embodiments, a service technician may interact with firmware 103 to obtain information from status structure 102A to identify the specific device (i.e., $CPU_1$ in the above examples of Tables 3-5) for which the action was initiated (e.g., to identify the root cause of the action being initiated). For instance, in certain implementations, firmware 103 may provide a user interface that a field service technician can access to see which CPUs (or other devices) have been deconfigured, including which device was explicitly deconfigured, which devices were sympathetically deconfigured, and an identification of the initiator that initiated the explicit deconfiguration. So, if the service technician is interested in repairing the actual problem device on the module (e.g., $CPU_1$ in the examples of Tables 3-5 above), such problem device can be identified as the one that was explicitly deconfigured.

Figure 3:
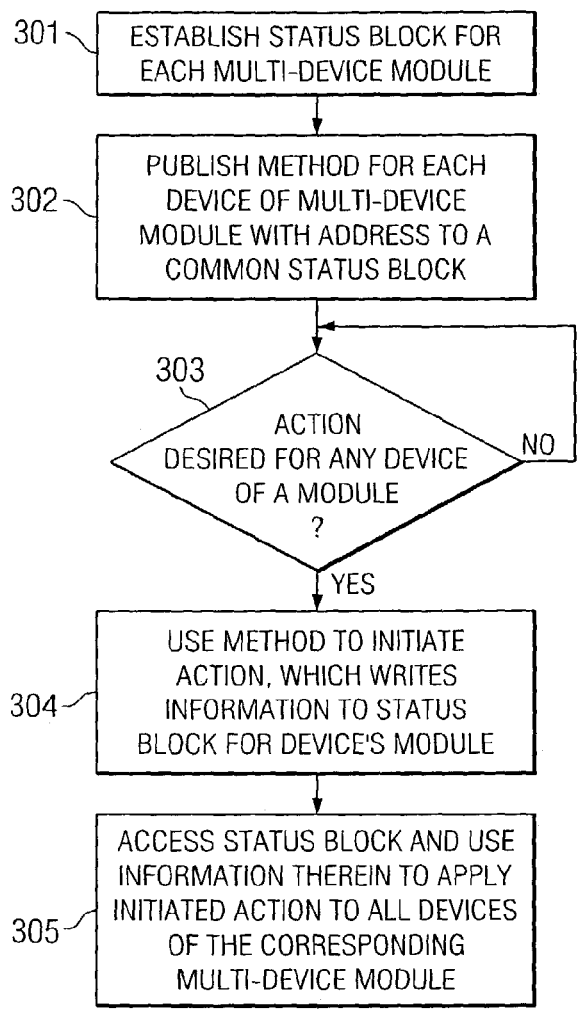
FIG. 3 shows an example operational flow diagram of one embodiment of the present invention.

Turning now to FIG. 3, an example operational flow diagram of one embodiment of the present invention is shown. In operational block 301, a status block (such as status blocks 102A and 102B of FIG. 1) is established for each multi-device module of a system. As described above, system firmware 103 initializes such status blocks. In operational block 302, a method is published for each device of a multi-device module with an address to a common status block for the module. For instance, a method may be published in ACPI tables 105 for deconfiguring each device of a module, and the deconfiguration method published for each device includes an address to a common status block to which information is to be written indicating that the deconfiguration method was initiated for the device. In block 303, it is determined whether an action is desired for any device of a module. For instance, it is determined whether the above-mentioned deconfiguration method is initiated for a device.

Once it is determined that an action is initiated (e.g., either by the OS, the system firmware, or a user), such as the above-mentioned deconfiguration method or other published method that comprises an address to the common status block of a module, operation advances to block 304. At block 304, the published method for a device is used to initiate the desired action for the device, which writes information indicating that the desired action has been initiated to the status block for the device's module. For instance, if the above-mentioned deconfiguration method is invoked for a first processor of a multi-processor module, the method causes information indicating that such deconfiguration has been initiated to be written to a status block for the multi-processor module that contains the first processor. In block 305, the module's status block is accessed and the information contained therein is used to apply the initiated action to all devices of the module. For instance, as described above, the system may be reset and the system firmware may access the status block and determine that all devices of the module are deconfigured in rebuilding the device tree of ACPI table 105.

Figure 4:
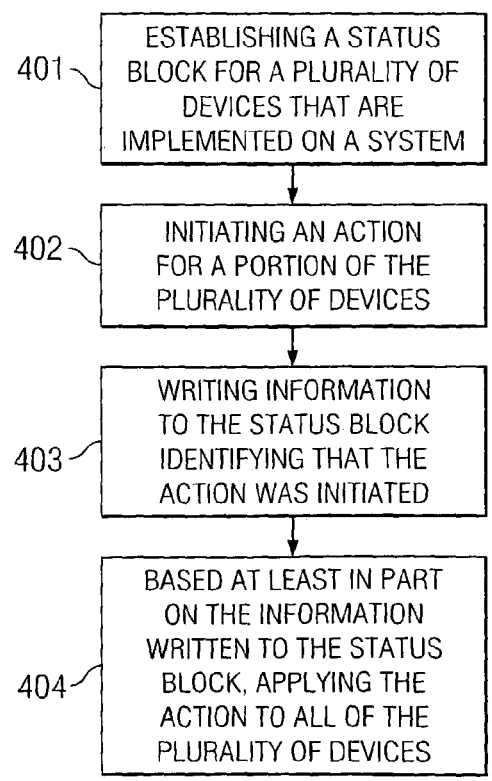
FIG. 4 shows another example operational flow diagram of an embodiment of the present invention.

Turning to FIG. 4, another example operational flow diagram of an embodiment of the present invention is shown. The operational flow of FIG. 4 comprises establishing a status block for a plurality of devices that are implemented on a system, in block 401. For instance, in the above example of FIG. 1, status block 102A is established for the plurality of devices (e.g., CPUs) included in CPU module A 104. The flow further comprises initiating an action for a portion of the plurality of devices, in block 402. For example, a deconfiguration method may be initiated for a portion (e.g., one) of the plurality of devices. The flow further comprises, in bock 403, writing information to the status block identifying that the action was initiated. The flow also comprises, in block 404, based at least in part on the information written to the status block (in block 403), applying the action to all of the plurality of devices.

While the example of applying a deconfiguration method initiated for one device to other devices is described above, it should be recognized that embodiments of the present invention may be used for various other types of actions. As one example, embodiments of the present invention may be used for reconfiguring a device. For instance, a module may have been previously deconfigured (in the manner described above), and all of the devices of a module may be reconfigured responsive to a method initiating reconfiguration of any one of the devices of such module. An AML method for performing reconfiguration may be published for each of the devices, and the reconfiguration methods of the devices may each set all but the signature bits in the module's status block to 0, thereby initiating the reconfiguration of all of the devices of such module. Embodiments of the present invention may be similarly applied for various other types of actions, and any such application is intended to be within the scope of the present invention.

Also, while the above examples are shown for a multi-processor module, it should be understood that embodiments of the present invention may be likewise applied to other types of modules having a plurality of devices. Further, embodiments of the present invention may be applied for any device that has an affinity with another device (e.g., is grouped in some manner with another device). That is, while the example embodiments described above implement a status block for a module that comprises multiple devices integrated therein, certain embodiments of the present invention may likewise be applied for discrete devices (i.e., that are not integrated within a common module) to enable an action initiated for any one of such discrete devices to be applied to all of such discrete devices that are logically "grouped" by inclusion in a common status block. For instance, embodiments of the present invention may be utilized for any devices that have some type of interdependency or relationship such that it is desired to have an action initiated for one of the devices to be applied to all of those devices. As one example, an embodiment of the present invention may be implemented for discrete disk drives that are set up for Redundant Array of Independent Disks ("RAID") within a system, wherein it may be desirable to deconfigure all of the disk drives if any one of the disk drives is deconfigured. Firmware may create a status block that includes status information for all of the disk drives, and a deconfigure method for the disk drives may be published on the system for each disk drive, wherein each disk drive's deconfiguration method causes information to be written to the status block that is common to all of the disk drives in a manner similar to that described above.

Additionally, it should be understood that all of the grouped devices do not have to be the same type of device. For instance, a module may comprise a processor device and a memory device, and embodiments of the present invention may be utilized to enable such devices to be treated in a common manner (e.g., if an action is initiated for one of the devices, it is automatically applied to the other device(s) of the module) in the manner described above. Similarly, different types of discrete devices may be logically grouped for application of certain actions thereto by their inclusion in a common status block.

What is claimed is:

1. A method of applying an action initiated for a portion of a plurality of devices to all of the plurality of devices, said method comprising:
   firmware in a system establishing a status block for a plurality of devices that are implemented on said system;
   initiating an action for a portion of said plurality of devices;
   writing information to said status block identifying that said action was initiated; and
   said firmware accessing said information written to said status block and applying said action to all of said plurality of devices.

2. The method of claim 1 wherein a multi-device module comprises said plurality of devices.

3. The method of claim 1 wherein said portion of said plurality of devices comprise any one of said plurality of devices.

4. The method of claim 1 wherein said plurality of devices are discrete devices.

5. The method of claim 1 wherein said writing information to said status block comprises:
   writing information that identifies said portion of said plurality of devices for which said action was explicitly initiated.

6. The method of claim 5 wherein said writing information to said status block further comprises:
   writing information that identifies ones of said plurality of devices for which said action was not explicitly initiated but was sympathetically applied thereto.

7. The method of claim 1 comprising:
   a user performing said initiating said action.

8. The method of claim 1 comprising:
   an operating system performing said initiating said action.

9. The method of claim 1 comprising:
   system firmware performing said initiating said action.

10. The method of claim 1 comprising:
    detecting a multi-device module on said system, wherein said multi-device module comprises said plurality of devices; and
    creating said status block for said multi-device module.

11. The method of claim 1 comprising:
    for each of said plurality of devices, publishing to said system a method for initiating said action, wherein each of the published methods is operable to cause said writing of said information to said status block.

12. The method of claim 11 wherein the published methods comprise Advanced Configuration and Power Management Interface ("ACPI") Machine Language ("AML") methods published to an ACPI table on said system.

13. The method of claim 1 wherein said action comprises device deconfiguration.

14. A system comprising:
a plurality of devices;
means for storing status information for said plurality of devices;
means for initiating an action for altering status of a portion of said plurality of devices, wherein said altering writes said status information to the storing means; and
means for applying said action for altering status of said portion of said plurality of devices to other ones of said plurality of devices in addition to said portion based at least in p art on said status information written to the storing means, said means for applying said action comprising firmware in said system.

15. The system of claim 14 comprising:
a multi-device module comprising said plurality of devices.

16. The system of claim 14 wherein said means for initiating is unaware of said plurality of devices being grouped into said multi-device module.

17. The system of claim 14 wherein said action for altering status of a portion of said plurality of devices comprises an action for deconfiguring said portion of said plurality of devices.

18. The system of claim 14 wherein said means for applying applies said action to all of said plurality of devices.

19. The system of claim 14 further comprising:
means for publishing to said system for each of said plurality of devices, a method operable to perform said action.

20. The system of claim 14 wherein said action for altering status of said portion of said plurality of devices comprises one selected from the group consisting of:
deconfiguring said portion of said plurality of devices and configuring said portion of said plurality of devices.

21. The system of claim 14 wherein said plurality of devices comprise processors.

22. The system of claim 14 wherein said means for initiating is unaware that said action for altering status of said portion of said plurality of devices is to be applied to said other ones of said plurality of devices.

23. A system comprising:
a plurality of devices grouped into a multi-device module;
a status block corresponding to said multi-device module; and
an initiator operable to communicatively access said status block, wherein said initiator is unaware of said plurality of devices being grouped into said multi-device module and wherein said initiator is operable to initiate an action for any one of said plurality of devices, and upon said action being initiated for any one of said plurality of devices information identifying the initiated action is written to said status block.

24. The system of claim 23 wherein said initiator comprises an operating system.

25. The system of claim 24 wherein said operating system comprises an Advanced Configuration and Power Management Interface ("ACPI")-compatible operating system.

26. The system of claim 25 further comprising:
an ACPI table publishing for said operating system a method for initiating said action for each of said plurality of devices.

27. The system of claim 23 wherein said initiator comprises firmware.

28. The system of claim 23 further comprising:
firmware operable to communicatively access said status block.

29. The system of claim 28 wherein, responsive to said information identifying the initiated action being included said status block, said firmware is operable to apply said action to multiple ones of said plurality of devices.

30. The system of claim 29 wherein said firmware is operable to apply said action to all of said plurality of devices.

31. The system of claim 29 wherein said firmware is operable to apply said action upon a reset of said system.

32. The system of claim 23 wherein said plurality of devices comprise a plurality of processors.

* * * * *

UNITED STATES PATENT AND TRADEMARK OFFICE
CERTIFICATE OF CORRECTION

PATENT NO. : 7,392,329 B2 Page 1 of 1
APPLICATION NO. : 10/401820
DATED : June 24, 2008
INVENTOR(S) : Scott Lynn Michaelis et al.

It is certified that error appears in the above-identified patent and that said Letters Patent is hereby corrected as shown below:

On the Title page, item (73), in "Assignee", in column 1, line 1, delete "Devopment" and insert -- Development --, therefor.

In column 2, line 36, delete "multi-service" and insert -- multi-device --, therefor.

In column 2, line 48, after "may" insert -- be --.

In column 17, line 17, in Claim 14, delete "p art" and insert -- part --, therefor.

Signed and Sealed this

Thirtieth Day of September, 2008

JON W. DUDAS
*Director of the United States Patent and Trademark Office*